US011111986B2

(12) United States Patent
Takeuchi

(10) Patent No.: US 11,111,986 B2
(45) Date of Patent: Sep. 7, 2021

(54) TRANSMISSION AND VEHICLE

(71) Applicant: YAMAHA HATSUDOKI KABUSHIKI KAISHA, Iwata (JP)

(72) Inventor: Yoshihiko Takeuchi, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 83 days.

(21) Appl. No.: 15/858,184

(22) Filed: Dec. 29, 2017

(65) Prior Publication Data

US 2018/0119749 A1 May 3, 2018

Related U.S. Application Data

(63) Continuation-in-part of application No. PCT/JP2016/073682, filed on Aug. 10, 2016.

(30) Foreign Application Priority Data

Aug. 10, 2015 (JP) .............................. JP2015-158324
Aug. 10, 2015 (JP) .............................. JP2015-158325

(Continued)

(51) Int. Cl.
*F16H 3/083* (2006.01)
*F16H 3/089* (2006.01)
(Continued)

(52) U.S. Cl.
CPC ............ *F16H 3/089* (2013.01); *B62M 11/06* (2013.01); *F16D 11/10* (2013.01); *F16D 11/14* (2013.01);
(Continued)

(58) Field of Classification Search
CPC ............ F16H 3/091; F16H 2061/0474; F16H 2063/3093; F16H 2200/0013; F16H 63/18; F16H 3/089; F16H 3/083
See application file for complete search history.

(56) References Cited

U.S. PATENT DOCUMENTS 4,416,168 A * 11/1983 Arai ........................ F16H 3/089
475/142
4,658,661 A * 4/1987 Terashita ................ B60K 17/08
74/331

(Continued)

FOREIGN PATENT DOCUMENTS

CN 202195025 U 4/2012
CN 102691757 A 9/2012
(Continued)

OTHER PUBLICATIONS

English translation of PCT/JP2016073682 (Year: 2016).*

*Primary Examiner* — Randell J Krug
(74) *Attorney, Agent, or Firm* — Rabin & Berdo, P.C.

(57) ABSTRACT

Incongruity sense of a driver due to dog clunking noise can be reduced with reduction of dog clunking noise. A fifth-speed driving gear (425) and a sixth-speed driving gear (426) are arranged on a driving shaft (41) along an axial direction. A first slider (451) is disposed to be movable in the axial direction between the fifth-speed driving gear (425) and the sixth-speed driving gear (426). The first slider (451) is not rotatable on the driving shaft (41). In the axial direction, the sum of the widths of the fifth-speed driving gear (425) and the sixth-speed driving gear (426) is smaller than the maximum width of the first slider (451).

9 Claims, 8 Drawing Sheets

(30) Foreign Application Priority Data

Aug. 10, 2015 (JP) .............................. JP2015-158326
Aug. 10, 2015 (JP) .............................. JP2015-158327

(51) Int. Cl.

| | |
|---|---|
| F16H 63/18 | (2006.01) |
| F16D 23/14 | (2006.01) |
| F16D 21/04 | (2006.01) |
| F16D 11/10 | (2006.01) |
| F16H 63/30 | (2006.01) |
| F16H 3/091 | (2006.01) |
| B62M 11/06 | (2006.01) |
| F16H 37/02 | (2006.01) |
| F16H 61/32 | (2006.01) |
| F16D 11/14 | (2006.01) |
| F16D 23/12 | (2006.01) |
| F16H 61/04 | (2006.01) |
| F16H 61/28 | (2006.01) |
| F16H 63/32 | (2006.01) |

(52) U.S. Cl.

CPC ............. *F16D 21/04* (2013.01); *F16D 23/12* (2013.01); *F16D 23/14* (2013.01); *F16H 3/083* (2013.01); *F16H 3/091* (2013.01); *F16H 37/02* (2013.01); *F16H 61/32* (2013.01); *F16H 63/18* (2013.01); *F16H 63/30* (2013.01); *F16H 63/304* (2013.01); *B60Y 2200/12* (2013.01); *F16D 2023/123* (2013.01); *F16H 63/32* (2013.01); *F16H 2061/0474* (2013.01); *F16H 2061/2869* (2013.01); *F16H 2063/3056* (2013.01); *F16H 2063/3093* (2013.01); *F16H 2200/0013* (2013.01); *F16H 2200/0052* (2013.01)

(56) References Cited

U.S. PATENT DOCUMENTS

| | | | | |
|---|---|---|---|---|
| 4,949,587 | A * | 8/1990 | Oka | F16D 7/027 192/55.1 |
| 5,368,145 | A | 11/1994 | Davis | |
| 6,095,004 | A | 8/2000 | Ota et al. | |
| 6,095,303 | A | 8/2000 | Gutmann et al. | |
| 6,354,417 | B1 | 3/2002 | Narita et al. | |
| 6,725,962 | B1 * | 4/2004 | Fukuda | F16D 63/006 180/292 |
| 7,445,575 | B2 | 11/2008 | Capito | |
| 7,631,570 | B2 | 12/2009 | Mizuno et al. | |
| 7,752,936 | B2 | 7/2010 | Kobayashi et al. | |
| 8,328,686 | B2 | 12/2012 | Kobayashi et al. | |
| 9,541,193 | B2 | 1/2017 | Arai et al. | |
| 10,393,264 | B2 | 8/2019 | Takahashi | |
| 2005/0039558 | A1 * | 2/2005 | Shen | B62M 11/00 74/335 |
| 2006/0053966 | A1 * | 3/2006 | Hori | F16H 3/006 74/640 |
| 2006/0090584 | A1 * | 5/2006 | Ho | F16H 63/18 74/473.36 |
| 2007/0240955 | A1 * | 10/2007 | Zenno | B60W 10/02 192/3.54 |
| 2007/0243973 | A1 * | 10/2007 | Minami | F16H 63/46 477/109 |
| 2008/0098837 | A1 | 5/2008 | Hiroi et al. | |
| 2008/0178695 | A1 | 7/2008 | Fujimoto et al. | |
| 2008/0214348 | A1 | 9/2008 | Hasegawa et al. | |
| 2009/0178874 | A1 | 7/2009 | Mizutani et al. | |
| 2009/0205455 | A1 | 8/2009 | Kosugi | |
| 2009/0270224 | A1 | 10/2009 | Minami | |
| 2010/0064848 | A1 * | 3/2010 | Komori | F16H 61/04 74/665 N |
| 2011/0232400 | A1 | 9/2011 | Tanaka et al. | |
| 2012/0240698 | A1 | 9/2012 | Ogawa et al. | |
| 2012/0247241 | A1 * | 10/2012 | Takahashi | F16H 3/16 74/329 |
| 2014/0291102 | A1 * | 10/2014 | Iwasaki | F16D 11/14 192/69.8 |
| 2015/0176683 | A1 * | 6/2015 | Takahashi | F16D 11/14 74/337.5 |
| 2015/0176706 | A1 * | 6/2015 | Saitoh | F16H 63/38 74/473.36 |

FOREIGN PATENT DOCUMENTS

| | | |
|---|---|---|
| EP | 1580454 A1 | 9/2005 |
| EP | 2042784 A1 | 4/2009 |
| EP | 2515009 A2 | 10/2012 |
| EP | 2708773 A1 | 3/2014 |
| FR | 2887604 A1 | 12/2006 |
| JP | S48-65961 U | 8/1973 |
| JP | S4844373 Y1 | 12/1973 |
| JP | S4938835 Y1 | 10/1974 |
| JP | S5628346 A | 3/1981 |
| JP | S63-187726 U | 12/1988 |
| JP | H03-148391 A | 6/1991 |
| JP | H06-123355 A | 5/1994 |
| JP | H07-054995 A | 2/1995 |
| JP | 2000027991 A | 1/2000 |
| JP | 2005-042910 A | 2/2005 |
| JP | 2007-162819 A | 6/2007 |
| JP | 2008-38922 A | 2/2008 |
| JP | 2008-106918 A | 5/2008 |
| JP | 2009-024790 A | 2/2009 |
| JP | 2009-197823 A | 9/2009 |
| JP | 2010096190 A | 4/2010 |
| JP | 2011080538 A | 4/2011 |
| JP | 2011-196520 A | 10/2011 |
| JP | 2013217491 A | 10/2013 |
| JP | 2014-035063 A | 2/2014 |
| JP | 2014-59002 A | 4/2014 |
| JP | 2014-206233 A | 10/2014 |
| JP | 2015-117798 A | 6/2015 |
| JP | 2015-121244 A | 7/2015 |
| KR | 2013-0061788 A | 6/2013 |

* cited by examiner

TRANSMISSION AND VEHICLE

CROSS-REFERENCES TO RELATED APPLICATIONS

The present application is a continuation-in-part application of International Application No. PCT/JP2016/073682, filed on Aug. 10, 2016, and having the benefit of the earlier filing dates of Japanese Application No. 2015-158324, filed on Aug. 10, 2015, Japanese Application No. 2015-158325, filed on Aug. 10, 2015, Japanese Application No. 2015-158326, filed on Aug. 10, 2015, and Japanese Application No. 2015-158327, filed on Aug. 10, 2015. The content of each of the identified applications is incorporated herein by reference in its entirety.

TECHNICAL FIELD

The present invention relates to a transmission to be mounted on a vehicle, and a vehicle including the transmission.

BACKGROUND ART

A transmission to be mounted on a vehicle includes a driving shaft connected to a power source (e.g., an engine and a motor) through a clutch mechanism and a driven shaft extending in parallel with the driving shaft. Each of the driving shaft and the driven shaft is provided with gears in a number corresponding to the number of gear stages. In a transmission having such a configuration, in each gear stage, a driving gear provided on the driving shaft and a driven gear provided on the driven shaft mesh each other to thereby constitute a gear pair. Such gear pairs have different transmission ratios. The transmission is configured in such a manner that only the gear pair corresponding to a selected gear stage transfers power.

A transmission disclosed in Patent Document 1, for example, includes a shift drum and a shift fork. The shift drum is configured to be rotatable about a drum shaft extending in parallel with the driving shaft and the driven shaft. The outer peripheral surface of the shift drum has a guide groove. An end of the shift fork is engaged with the guide groove of the shift drum. A fork receiving groove is formed in one of a pair of adjacent driving gears provided on the driving shaft. The other end of the shift fork is engaged with the fork receiving groove.

The one of the driving gears is configured to be displaced along the driving shaft. An angle of rotation (rotation angle) about the drum shaft of the shift drum changes depending on a selected gear stage. The position of the guide groove in the direction in which the drum shaft extends (drum shaft direction) changes depending on the rotation angle. That is, the shift fork engaged with the guide groove moves in the drum shaft direction depending on the selected gear stage. Accordingly, the one of the driving gears engaged with the shift fork through the fork receiving groove is displaced along the driving shaft.

The one of the driving gears is configured in a relative non-rotatable manner with respect to the driving shaft. The driven gear engaged with the one of the driving gears is configured in a relative rotatable manner with respect to the driven shaft. The other one of the pair of driving gears (other driving gear) is configured in a relative rotatable manner with respect to the driving shaft. The driven gear engaged with the other driving gear is configured in a relative non-rotatable manner with respect to the driven shaft.

The one of the driving gears has dog projections. The dog projections extend toward the other driving gear. The other driving gear has dog projections or dog recesses. When the one of the driving gears is displaced toward the other driving gear along the driving shaft with rotation of the shift drum, the dog projections of adjacent ones of the driving gears are engaged with each other or the dog projections of the one of the driving gears and the dog recesses of the other driving gear are engaged with each other. Accordingly, the other driving gear rotates in synchronization with the one of the driving gears. In this manner, power is transferred through the gear pair including the other driving gear. That is, in the transmission, a transmission operation is performed by movement of the one of the driving gears along the driving shaft.

CITATION LIST

Patent Document

Patent Document 1: Japanese Patent Application Publication No. 2014-035063

SUMMARY OF INVENTION

Technical Problem

In the transmission having a configuration as described above, occurrence of noise called "dog clunking noise" is unavoidable in a transmission operation. In rotation of the driving shaft, the one of the driving gears having dog projections and the other driving gear having dog projections or dog recesses rotate relatively to each other. Dog clunking noise is noise occurring when rotation of the driving gear synchronizes with rotation of the driven gear. Specifically, dog clunking noise occurs when the one of the driving gears approaches the other driving gear and the front ends of the dog projections collide with a side surface (a portion where neither dog projections nor dog recesses are provided) of the other driving gear (collision in the axial direction of the gears). Irrespective of whether the collision described above occurs or not, dog clunking noise also occurs when side surfaces of the dog projections collide with each other or side surfaces of the dog projections collide with side surfaces of the dog recesses (collision in the circumferential direction of the gears).

In addition, in the transmission, dog clunking noise tends to vary even under the same transmission conditions. Thus, incongruity sense of a driver increases. This is due to the presence of clearances between an end of the shift fork and the inner surface of the guide groove of the shift drum and between the other end of the shift fork and the inner surface of the fork receiving groove of the driving gear. The presence of these clearances tends to tilt the shift fork. Thus, when the one of the driving gears moves along the driving shaft, displacement of the one of the driving gears is unlikely to be stable.

In view of the above, the present invention can obtain a configuration of a transmission that can reduce incongruity sense of a driver due to dog clunking noise while reducing dog clunking noise.

Solution to Problem

The inventor of the present invention expected that dog clunking noise can be reduced by reducing the moment of inertia of a member related to collision. This is because if the moment of inertia of the member related to collision is small, collision energy directly related to dog clunking noise can be reduced.

In view of this, first, the inventor had an idea of separating the dog projections from the one of the driving gears. Specifically, the inventor had an idea of employing a configuration in which a slider that can be displaced along the driving shaft is disposed between adjacent driving gears and the slider has dog projections. In this configuration, the shift fork is engaged with the slider. In this manner, as compared to a case where the one of the driving gears is displaced along the driving shaft, the mass and the radius of a member having dog projections (slider) can be reduced. Consequently, the moment of inertia of the member can be reduced. As a result, dog clunking noise can be reduced.

By reducing the radius of the slider as described above, the shift fork can exert a force of moving the slider on the slider at a position closer to the driving shaft. Accordingly, while the slider moves, the posture of the slider can be stabilized. As a result, by separating the one of the driving gears from the dog projections as described above, not only reduction of dog clunking noise but also reduction of incongruity sense of a driver due to variations of dog clunking noise can be reduced.

The inventor found that when it is unnecessary to displace the driving gear along the driving shaft as described above, the face width of the driving gear (the length of teeth of the gear in the axial direction of the driving shaft) does not need to be increased in order to maintain meshing between the driving gear and the driven gear. That is, the inventor found that the width of the driving gear in the axial direction of the driving shaft can be reduced. As described above, when the thickness of the driving gear juxtaposed with the slider in the axial direction is reduced, the moment of inertia of the driving gear related to collision of the dog projections can be reduced. In particular, in a transmission in which a driving gear and a driven gear always mesh with each other, when a specific gear is caused to rotate by engagement between dog projections and dog recesses, this rotation is transferred to a gear that meshes with the specific gear. Through the shaft on which the gear meshing with the specific gear is disposed, the rotation is transferred to the entire gear train provided on this shaft. Thus, by reducing the moment of inertia of a specific gear, the moment of inertia of the entire gear train including a gear meshing with the specific gear can be reduced. As a result, dog clunking noise can be further reduced.

The inventor focused on a ratio between the maximum width of the slider and the sum of the widths of a pair of driving gears adjacent to the slider in the direction along the driving shaft (hereinafter referred to as an axial direction), as an index for defining the thinness of the width of a driving gear in the axial direction. Through an inventive study, the inventor found that a desired advantage can be obtained by reducing the width of at least one of the two driving gears so that the ratio is below 100%. In other words, the inventor found that a desired advantage can be obtained in a case where the sum of the widths of a pair of driving gears adjacent to the slider is smaller than the maximum width of the slider in the axial direction.

In the foregoing description, the configuration in which the slider is disposed between a pair of driving gears disposed adjacent to each other along the axial direction on the driving shaft and the slider has dog projections is used as an example. Alternatively, the slider may be disposed between a pair of driven gears arranged adjacent to each other along the axial direction on the driven shaft. In this case, the slider moves in the axial direction of the driven shaft. The driving gear or the driven gear may have dog projections. The slider may have dog recesses.

In the following description, the term "adjacent" refers to a state in which members are next to each other along one direction.

A transmission according to an aspect of the present invention is a transmission that is mountable on a vehicle. This transmission includes: a driving shaft connectable to a power source through a clutch mechanism; a first driving gear and a second driving gear arranged on the driving shaft along an axial direction and fixed to the driving shaft in the axial direction; a driven shaft extending in the axial direction; a first driven gear and a second driven gear arranged on the driven shaft along the axial direction and fixed to the driven shaft in the axial direction, the first driven gear meshing with the first driving gear, the second driven gear meshing with the second driving gear; a slider positioned on one of the driving shaft and the driven shaft, the slider disposed to be movable in the axial direction between the first driving gear and the second driving gear on the driving shaft or between the first driven gear and the second driven gear on the driven shaft; a shift drum disposed to be rotatable about a drum shaft extending in the axial direction; and a shift fork coupling the shift drum and the slider to each other.

A first dog projection is provided on one of the slider or the first driving gear in a case where the slider is disposed on the driving shaft, or provided on one of the slider or the first driven gear in a case where the slider is provided on the driven shaft. A first dog recess is provided on the other one of the slider or the first driving gear in a case where the slider is provided on the driving shaft, or provided on the other one of the slider or the first driven gear in a case where the slider is provided on the driven shaft. A second dog projection is provided on one of the slider or the second driving gear in a case where the slider is provided on the driving shaft, or provided on one of the slider or the second driven gear in a case where the slider is provided on the driven shaft. A second dog recess is provided on the other one of the slider or the second driving gear in a case where the slider is provided on the driving shaft, or provided on the other one of the slider or the second driven gear in a case where the slider is provided on the driven shaft.

In the case where the slider is provided on the driving shaft, the first driving gear and the second driving gear are rotatable on the driving shaft, and the first driven gear and the second driven gear are not rotatable on the driven shaft. In the case where the slider is provided on the driven shaft, the first driving gear and the second driving gear are not rotatable on the driving shaft, and the first driven gear and the second driven gear are rotatable on the driven shaft.

In the case where the slider is provided on the driving shaft, the slider is not rotatable on the driving shaft, and in a case where the slider is provided on the driven shaft, the slider is not rotatable on the driven shaft. A transmission ratio between the first driving gear and the first driven gear is different from a transmission ratio between the second driving gear and the second driven gear.

When rotation of the shift drum changes a position of the shift fork in the axial direction so that the slider moves in the axial direction on the driving shaft or the driven shaft, the first dog projection and the first dog recess are engaged with each other or the second dog projection and the second dog recess are engaged with each other.

In the case where the slider is provided on the driving shaft, a sum of a width of the first driving gear fixed to the driving shaft in the axial direction and a width of the second driving gear fixed to the driving shaft in the axial direction is smaller than a maximum width of the slider. In the case where the slider is provided on the driven shaft, a sum of a width of the first driven gear fixed to the driven shaft in the axial direction and a width of the second driven gear fixed to the driven shaft in the axial direction is smaller than the maximum width of the slider.

Advantageous Effects of Invention

A transmission according to an aspect of the present invention can reduce incongruity sense of a driver due to dog clunking noise while reducing dog clunking noise.

DESCRIPTION OF EMBODIMENT

With reference to FIGS. 1 through 8, a vehicle 1 (an example of a vehicle) according to an embodiment will be described. In each drawing used in the following description, the scale is changed as appropriate in order to enable each member to be recognized. The "left" and "right" in the following description respectively represent the "left" and "right" when seen from a driver on the vehicle 1.

Figure 1:
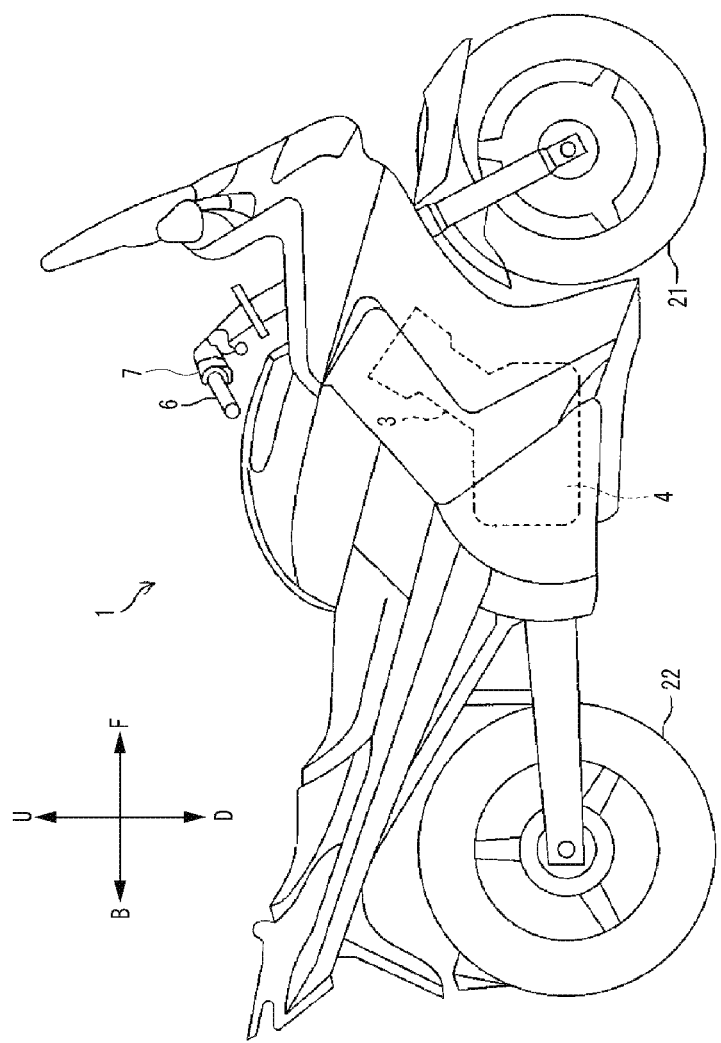
FIG. 1 is a right side view illustrating an appearance of a vehicle according to an embodiment.

FIG. 1 illustrates an appearance of the vehicle 1 when the vehicle 1 is seen from the right. Arrow F represents the forward direction of the vehicle 1. Arrow B represents the rearward direction of the vehicle 1. Arrow U represents the upward direction of the vehicle 1. Arrow D represents the downward direction of the vehicle 1.

In this embodiment, the vehicle 1 is a motorcycle that includes a front wheel 21 and a rear wheel 22. The vehicle 1 includes an internal combustion engine 3 (an example of a power source) and a transmission 4. In other words, the transmission 4 is mounted on the vehicle 1.

Figure 2:
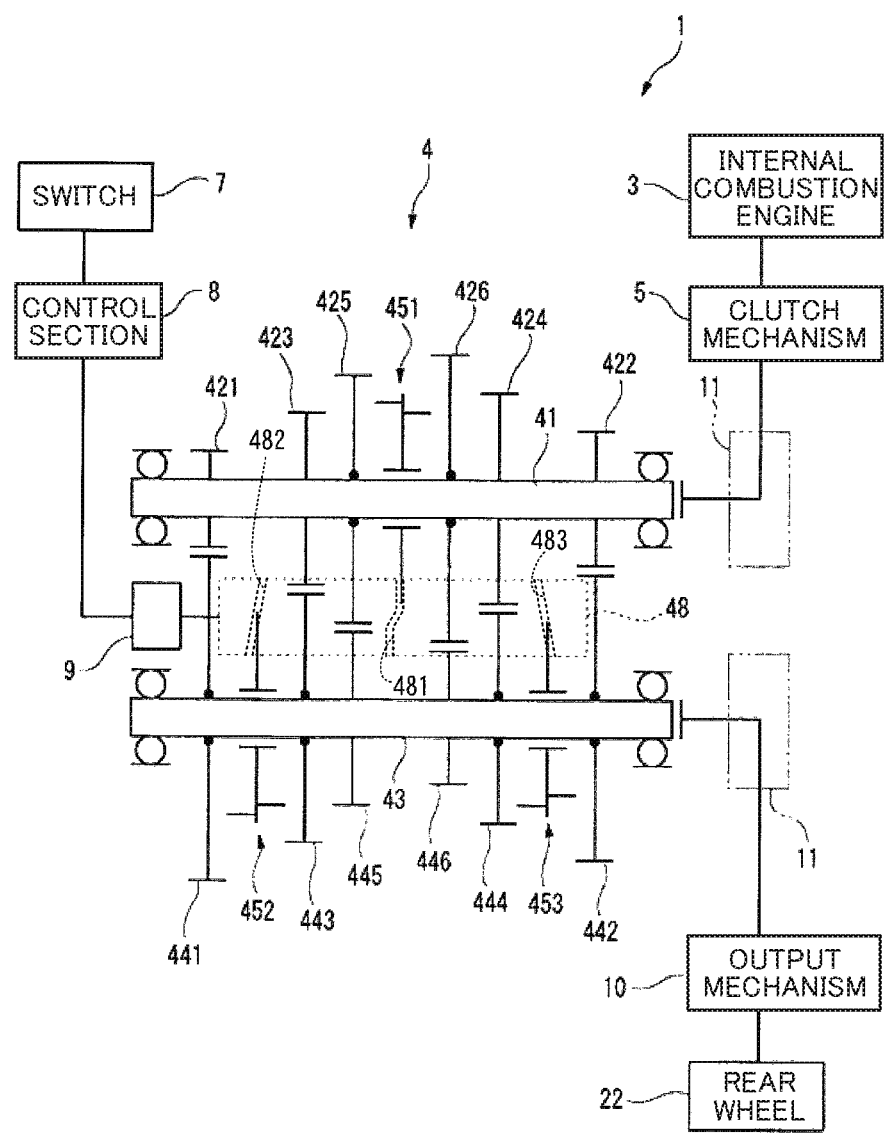
FIG. 2 is a view schematically illustrating a configuration of a transmission according to the embodiment.

FIG. 2 schematically illustrates a configuration of the transmission 4. The transmission 4 includes a driving shaft 41. The vehicle 1 includes a clutch mechanism 5. The driving shaft 41 is connected to the internal combustion engine 3 through the clutch mechanism 5. In the following description, the direction in which the driving shaft 41 extends is defined as an "axial direction."

The clutch mechanism 5 is configured to be switched between a connected state in which rotation of a crankshaft in the internal combustion engine 3 is transferred to the driving shaft 41 and a disconnected state in which rotation of the crankshaft is not transferred to the driving shaft 41.

The transmission 4 includes a first-speed driving gear 421, a second-speed driving gear 422, a third-speed driving gear 423, a fourth-speed driving gear 424, a fifth-speed driving gear 425, and a sixth-speed driving gear 426. The first-speed driving gear 421, the second-speed driving gear 422, the third-speed driving gear 423, the fourth-speed driving gear 424, the fifth-speed driving gear 425, and the sixth-speed driving gear 426 are arranged along the axial direction on the driving shaft 41.

The transmission 4 includes a driven shaft 43. The driven shaft 43 extends in the axial direction. That is, the driven shaft 43 extends in parallel with the driving shaft 41. The driven shaft 43 extends in the axial direction of the driving shaft 41.

The expression that the driving shaft 41 or the driven shaft 43 extends in the axial direction refers to a configuration in which the driving shaft 41 or the driven shaft 43 has a shape elongated in the axial direction.

The transmission 4 includes a first-speed driven gear 441, a second-speed driven gear 442, a third-speed driven gear 443, a fourth-speed driven gear 444, a fifth-speed driven gear 445, and a sixth-speed driven gear 446. The first-speed driven gear 441, the second-speed driven gear 442, the third-speed driven gear 443, the fourth-speed driven gear 444, the fifth-speed driven gear 445, and the sixth-speed driven gear 446 are arranged along the axial direction on the driven shaft 43.

The first-speed driven gear 441 always meshes with the first-speed driving gear 421, or in other words, the first-speed driven gear 441 is located at a fixed position with respect to the first-speed driving gear 421. The second-speed driven gear 442 always meshes with the second-speed driving gear 422. The third-speed driven gear 443 always meshes with the third-speed driving gear 423. The fourth-speed driven gear 444 always meshes with the fourth-speed driving gear 424. The fifth-speed driven gear 445 always meshes with the fifth-speed driving gear 425. The sixth-speed driven gear 446 always meshes with the sixth-speed driving gear 426. In the present specification and claims, the "meshing" of gears refers to the interleaving of the teeth of the gears with each other.

The first-speed driving gear 421 is not rotatable on the driving shaft 41. The first-speed driven gear 441 is rotatable on the driven shaft 43. In other words, the first-speed driving gear 421 is fixed with respect to the driving shaft 41, while the first-speed driven gear 441 is capable of rotating freely around the driven shaft 43 independent of the rotation of the driven shaft 43.

The second-speed driving gear 422 is not rotatable on the driving shaft 41. The second-speed driven gear 442 is rotatable on the driven shaft 43. In other words, the second-speed driving gear 422 is fixed with respect to the driving shaft 41, while the second-speed driven gear 442 is capable of rotating freely around the driven shaft 43 independent of the rotation of the driven shaft 43.

The third-speed driving gear 423 is not rotatable on the driving shaft 41. The third-speed driven gear 443 is rotatable on the driven shaft 43. In other words, the third-speed driving gear 423 is fixed with respect to the driving shaft 41, while the third-speed driven gear 443 is capable of rotating freely around the driven shaft 43 independent of the rotation of the driven shaft 43.

The fourth-speed driving gear 424 is not rotatable on the driving shaft 41. The fourth-speed driven gear 444 is rotatable on the driven shaft 43. In other words, the fourth-speed driving gear 424 is fixed with respect to the driving shaft 41, while the fourth-speed driven gear 444 is capable of rotating freely around the driven shaft 43 independent of the rotation of the driven shaft 43.

The fifth-speed driving gear 425 is rotatable on the driving shaft 41. The fifth-speed driven gear 445 is not rotatable on the driven shaft 43. In other words, the fifth-speed driving gear 425 is fixed with respect to the driving shaft 41, while the fifth-speed driven gear 445 is capable of rotating freely around the driven shaft 43 independent of the rotation of the driven shaft 43.

The sixth-speed driving gear 426 is rotatable on the driving shaft 41. The sixth-speed driven gear 446 is not rotatable on the driven shaft 43. In other words, the sixth-speed driving gear 426 is fixed with respect to the driving shaft 41, while the sixth-speed driven gear 446 is capable of rotating freely around the driven shaft 43 independent of the rotation of the driven shaft 43.

The transmission 4 includes a first slider 451. The first slider 451 is disposed on the driving shaft 41 between the fifth-speed driving gear 425 (an example of a first driving gear) and the sixth-speed driving gear 426 (an example of a second driving gear). The first slider 451 is movable on the driving shaft 41 in the axial direction. The first slider 451 is not rotatable on the driving shaft 41, or in other words, the first slider 451 is fixed with respect to the driving shaft 41 in a rotating direction to rotate together with the driving shaft 41.

The transmission 4 includes a second slider 452. The second slider 452 is disposed on the driven shaft 43 between the first-speed driven gear 441 (an example of the first driven gear) and the third-speed driven gear 443 (an example of the second driven gear). The second slider 452 is movable on the driven shaft 43 in the axial direction. The second slider 452 is not rotatable on the driven shaft 43, or in other words, the second slider 452 is fixed with respect to the driven shaft 43 in a rotating direction to rotate together with the driven shaft 43.

The transmission 4 includes a third slider 453. The third slider 453 is disposed on the driven shaft 43 between the second-speed driven gear 442 (an example of the first driven gear) and the fourth-speed driven gear 444 (an example of the second driven gear). The third slider 453 is movable on the driven shaft 43 in the axial direction. The third slider 453 is not rotatable on the driven shaft 43, or in other words, the third slider 453 is fixed with respect to the driven shaft 43 in a rotating direction to rotate together with the driven shaft 43.

Figure 3:
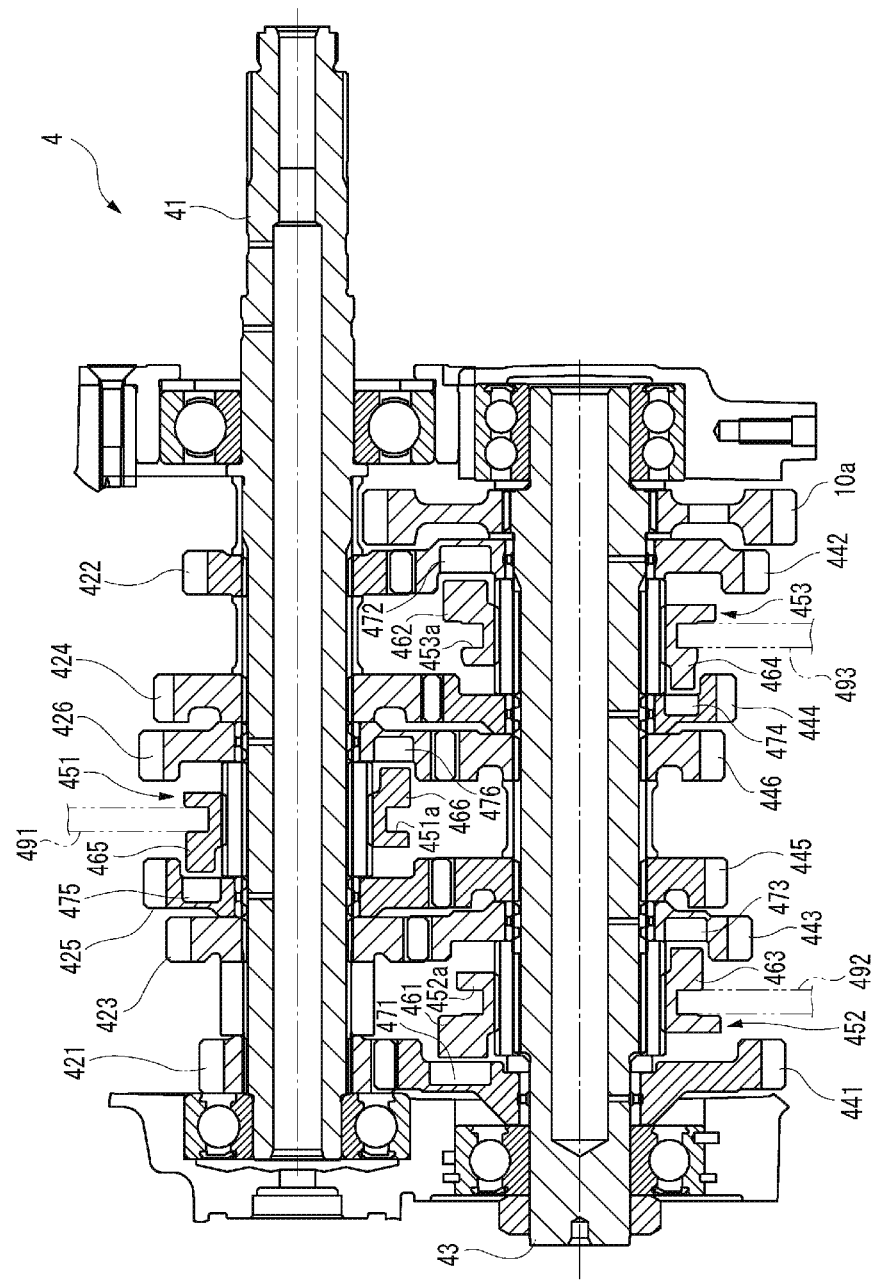
FIG. 3 is a cross-sectional view illustrating a specific configuration of a part of the transmission.

FIG. 3 illustrates a further detailed configuration of the transmission 4. FIG. 3 is a cross-sectional view of the transmission 4 taken in the axial direction.

The transmission 4 includes fifth-speed dog projections 465 and fifth-speed dog recesses 475. The fifth-speed dog projections 465 (an example of a first dog projection) are provided on the first slider 451. The fifth-speed dog recesses 475 (an example of a first dog recess) are provided on the fifth-speed driving gear 425.

The transmission 4 includes sixth-speed dog projections 466 and sixth-speed dog recesses 476. The sixth-speed dog projections 466 (an example of a second dog projection) are provided on the first slider 451. The sixth-speed dog recesses 476 (an example of a second dog recess) are provided on the sixth-speed driving gear 426.

Figure 4:
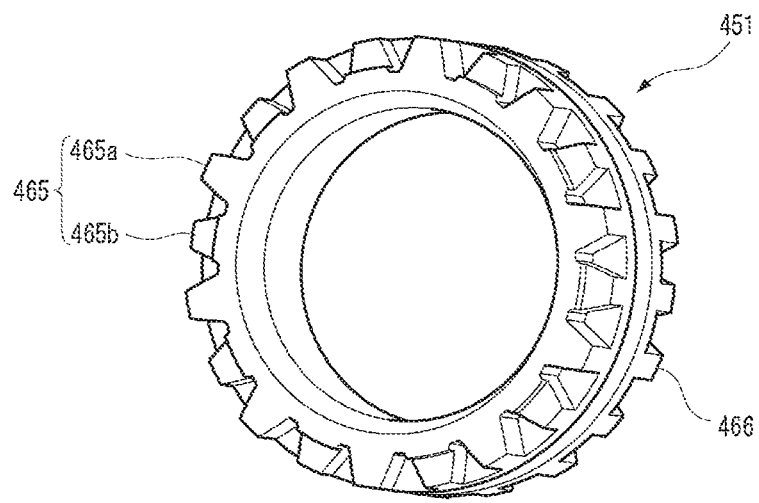
FIG. 4 is a perspective view illustrating a slider part of the transmission.
Figure 5:
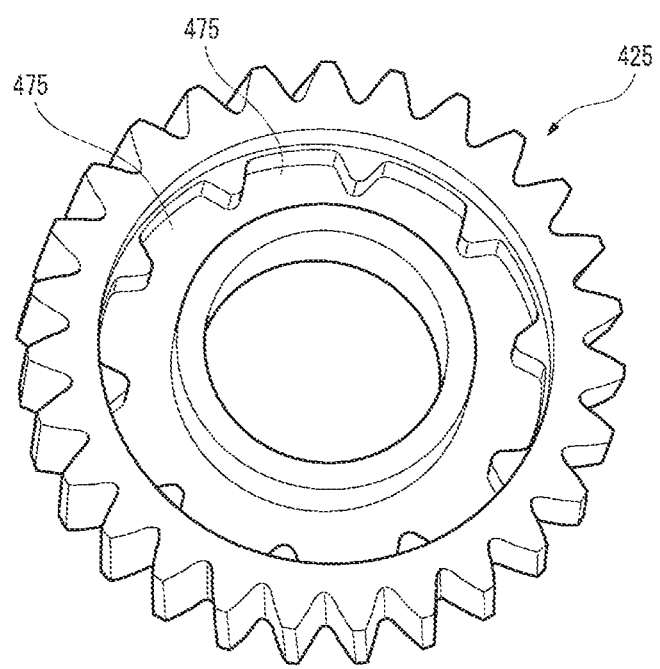
FIG. 5 is a perspective view illustrating a driving gear part of the transmission.
Figure 6:
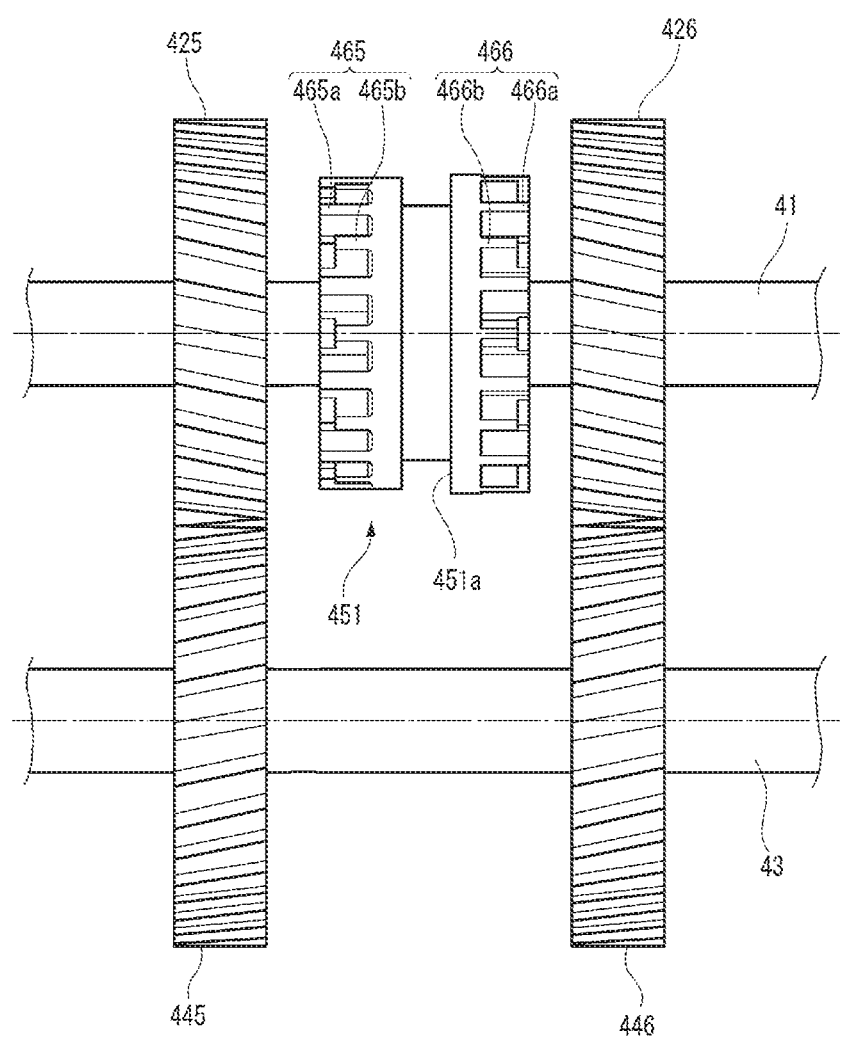
FIG. 6 is a side view illustrating another part of the transmission.

FIG. 4 is a perspective view illustrating an appearance of the first slider 451. The first slider 451 has a ring shape. FIG. 5 is a perspective view illustrating an appearance of the fifth-speed driving gear 425. FIG. 6 is a side view illustrating the fifth-speed driving gear 425, the sixth-speed driving gear 426, and the first slider 451 disposed on the driving shaft 41 together with the fifth-speed driven gear 445 and the sixth-speed driven gear 446 disposed on the driven shaft 43.

As illustrated in FIG. 4, on the first slider 451, the plurality of fifth-speed dog projections 465 are arranged along the circumferential direction. As also clearly shown in FIG. 6, the plurality of fifth-speed dog projections 465 include two types of fifth-speed dog projections 465a and 465b having different lengths in the axial direction. In the axial direction, the length of the fifth-speed dog projections 465a is larger than that of the fifth-speed dog projections 465b. The fifth-speed dog projections 465a and the fifth-speed dog projections 465b are alternately arranged along the circumferential direction on the first slider 451.

On the first slider 451, the plurality of sixth-speed dog projections 466 are arranged along the circumferential direction about the driving shaft 41. As illustrated in FIG. 6, the plurality of sixth-speed dog projections 466 include two types of sixth-speed dog projections 466a and 466b having different lengths in the axial direction. In the axial direction, the length of the sixth-speed dog projections 466a is larger than that of the sixth-speed dog projections 466b. The sixth-speed dog projections 466a and the sixth-speed dog projections 466b are alternately arranged along the circumferential direction on the first slider 451.

As illustrated in FIG. 5, on the fifth-speed driving gear 425, the plurality of fifth-speed dog recesses 475 are arranged along the circumferential direction of the fifth-speed driving gear 425. The number of the plurality of fifth-speed dog recesses 475 is a half of the number of the plurality of fifth-speed dog projections 465. That is, each of the fifth-speed dog recesses 475 is configured to accommodate two of the fifth-speed dog projections 465.

Although not shown because of a configuration similar to that of the fifth-speed driving gear 425, the sixth-speed driving gear 426 has the plurality of sixth-speed dog recesses 476 arranged along the circumferential direction of the sixth-speed driving gear 426. The number of the plurality of sixth-speed dog recesses 476 is a half of the number of the plurality of sixth-speed dog projections 466. That is, each of the sixth-speed dog recesses 476 is configured to accommodate two of the sixth-speed dog projections 466.

As illustrated in FIG. 3, the transmission 4 includes first-speed dog projections 461 and first-speed dog recesses 471. The first-speed dog projections 461 (an example of the first dog projection) are provided on the second slider 452. The first-speed dog recesses 471 (an example of the first dog recess) are provided on the first-speed driven gear 441.

As illustrated in FIG. 3, the transmission 4 includes third-speed dog projections 463 and third-speed dog recesses 473. The third-speed dog projections 463 (an example of the second dog projection) are provided on the second slider 452. The third-speed dog recesses 473 (an example of the second dog recess) are provided on the third-speed driven gear 443.

Although not shown because of a configuration similar to that of the first slider 451, the second slider 452 has a ring shape. The plurality of first-speed dog projections 461 are arranged along the circumferential direction on the second slider 452. The plurality of first-speed dog projections 461 include two types of first-speed dog projections having different lengths in the axial direction of the driving shaft 41. The relatively long first-speed dog projections and the relatively short first-speed dog projections are alternately arranged along the circumferential direction on the second slider 452.

The plurality of third-speed dog projections 463 are arranged along the circumferential direction on the second slider 452. The plurality of third-speed dog projections 463 include two types of third-speed dog projections having different lengths in the axial direction. The relatively long third-speed dog projections and the relatively short third-speed dog projections are alternately arranged along the circumferential direction on the second slider 452.

Although not shown because of a configuration similar to that of the fifth-speed driving gear 425, the plurality of first-speed dog recesses 471 are arranged on the first-speed driven gear 441 along the circumferential direction of the first-speed driven gear 441. The number of the plurality of first-speed dog recesses 471 is a half of the number of the plurality of first-speed dog projections 461. That is, each of the first-speed dog recesses 471 is configured to accommodate two of the first-speed dog projections 461.

The plurality of third-speed dog recesses 473 are arranged along the circumferential direction of the third-speed driven gear 443 on the third-speed driven gear 443. The number of the plurality of third-speed dog recesses 473 is a half of the number of the plurality of third-speed dog projections 463. That is, each of the third-speed dog recesses 473 is configured to accommodate two of the third-speed dog projections 463.

As illustrated in FIG. 3, the transmission 4 includes second-speed dog projections 462 and second-speed dog recesses 472. The second-speed dog projections 462 (an example of the first dog projection) are provided on the third slider 453. The second-speed dog recesses 472 (an example of the first dog recess) are provided on the second-speed driven gear 442.

As illustrated in FIG. 3, the transmission 4 includes fourth-speed dog projections 464 and fourth-speed dog recesses 474. The fourth-speed dog projections 464 (an example of the second dog projection) are provided on the third slider 453. The fourth-speed dog recesses 474 (an example of the second dog recess) are provided on the fourth-speed driven gear 444.

Although not shown because of a configuration similar to that of the first slider 451, the third slider 453 has a ring shape. The plurality of second-speed dog projections 462 are arranged along the circumferential direction on the third slider 453. The plurality of second-speed dog projections 462 include two types of second-speed dog projections having different lengths in the axial direction of the driven shaft 43. The relatively long second-speed dog projections and the relatively short second-speed dog projections are alternately arranged along the circumferential direction on the third slider 453.

The plurality of fourth-speed dog projections 464 are arranged along the circumferential direction on the third slider 453. The plurality of fourth-speed dog projections 464 include two types of fourth-speed dog projections having different lengths in the axial direction. The relatively long fourth-speed dog projections and the relatively short fourth-speed dog projections are alternately arranged along the circumferential direction.

Although not shown because of a configuration similar to that of the fifth-speed driving gear 425, the plurality of second-speed dog recesses 472 are arranged along the circumferential direction of the second-speed driven gear 442 on the second-speed driven gear 442. The number of the plurality of second-speed dog recesses 472 is a half of the number of the plurality of second-speed dog projections 462. That is, each of the second-speed dog recesses 472 is configured to accommodate two of the second-speed dog projections 462.

The plurality of fourth-speed dog recesses 474 are arranged along the circumferential direction of the fourth-speed driven gear 444 on the fourth-speed driven gear 444. The number of the plurality of fourth-speed dog recesses 474 is a half of the number of the plurality of fourth-speed dog projections 464. That is, each of the fourth-speed dog recesses 474 is configured to accommodate two of the fourth-speed dog projections 464.

Figure 7:
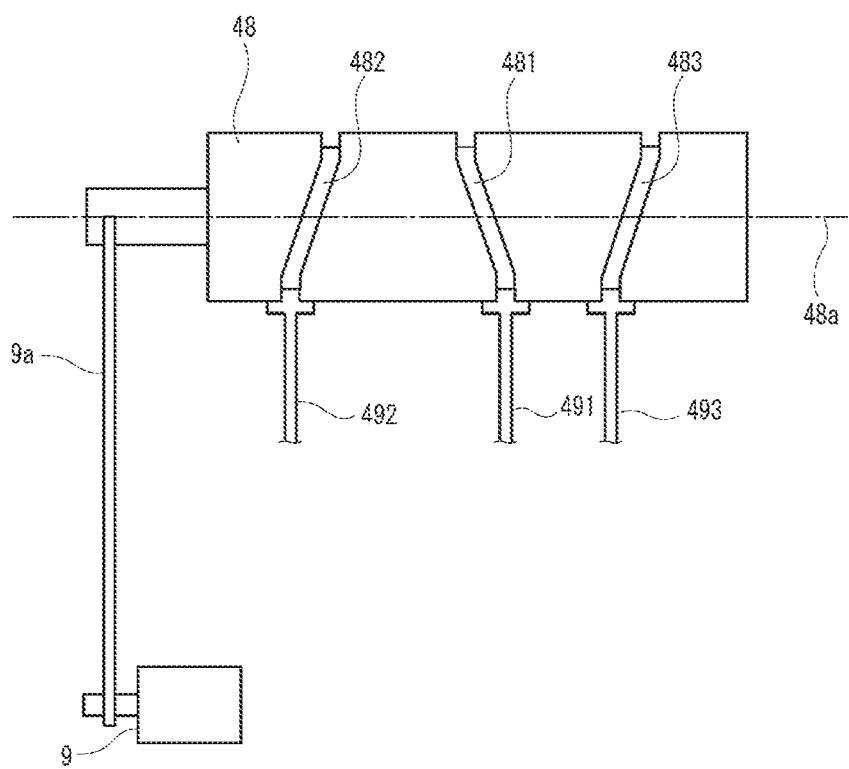
FIG. 7 is a view schematically illustrating a part of the transmission.

As illustrated in FIG. 2, the transmission 4 includes a shift drum 48. FIG. 7 illustrates a specific configuration of the shift drum 48. The shift drum 48 is cylindrical. The shift drum 48 includes a drum shaft 48a extending in the axial direction. The shift drum 48 is rotatable about the drum shaft 48a.

A first guide groove 481, a second guide groove 482, and a third guide groove 483 are formed on the outer peripheral surface of the shift drum 48. The first guide groove 481, the second guide groove 482, and the third guide groove 483 extend in such a manner that the positions of these grooves in the direction along the drum shaft 48a (i.e., the axial direction) change in accordance with the rotation angle about the drum shaft 48a of the shift drum 48.

The transmission 4 includes a first shift fork 491, a second shift fork 492, and a third shift fork 493. An end of the first shift fork 491 is located in the first guide groove 481 of the shift drum 48. An end of the second shift fork 492 is located in the second guide groove 482 of the shift drum 48. An end of the third shift fork 493 is located in the third guide groove 483 of the shift drum 48.

As illustrated in FIG. 3, a first fork receiving groove 451a is formed on the first slider 451. A second fork receiving groove 452a is formed on the second slider 452. A third fork receiving groove 453a is formed on the third slider 453.

As indicated by chain double-dashed lines in FIG. 3, the other end of the first shift fork 491 is connected to the first fork receiving groove 451a of the first slider 451. The other end of the second shift fork 492 is connected to the second fork receiving groove 452a of the second slider 452. The other end of the third shift fork 493 is connected to the third fork receiving groove 453a of the third slider 453.

That is, the first shift fork 491 couples the shift drum 48 and the first slider 451 to each other. The second shift fork 492 couples the shift drum 48 and the second slider 452 to each other. The third shift fork 493 couples the shift drum 48 and the third slider 453 to each other.

The transmission 4 of the vehicle 1 according to this embodiment has a configuration capable of performing six-stage transmission. Specifically, there are differences among a transmission ratio between the first-speed driving gear 421 and the first-speed driven gear 441, a transmission ratio between the second-speed driving gear 422 and the second-speed driven gear 442, a transmission ratio between the third-speed driving gear 423 and the third-speed driven gear 443, a transmission ratio between the fourth-speed driving gear 424 and the fourth-speed driven gear 444, a transmission ratio between the fifth-speed driving gear 425 and the fifth-speed driven gear 445, and a transmission ratio between the sixth-speed driving gear 426 and the sixth-speed driven gear 446.

As illustrated in FIG. 1, the vehicle 1 includes a handlebar 6. The handlebar 6 is configured to change the direction of the front wheel 21 in accordance with an operation of a driver. The change of the direction of the front wheel 21 changes the travelling direction of the vehicle 1.

A illustrated in FIGS. 1 and 2, the vehicle 1 includes a switch 7, a control section 8, and an electric actuator 9.

The switch 7 is provided on the handlebar 6. The switch 7 is configured to be operated by the driver to thereby output a signal for causing the transmission 4 to perform a transmission operation.

The control section 8 is configured to output a signal for controlling an operation of the electric actuator 9 in accordance with a signal input from the switch 7.

As illustrated in FIG. 7, the electric actuator 9 is coupled to the shift drum 48 through a rod 9a. The electric actuator 9 is configured to rotate the shift drum 48 about the drum shaft 48a in accordance with a signal input from the control section 8 through the rod 9a. That is, the electric actuator 9 is configured to rotate the shift drum 48 in accordance with an operation of the switch 7. The rotation angle of the shift drum 48 is determined depending on a selected gear stage.

In this manner, in accordance with the angle of rotation of the shift drum 48 about the drum shaft 48a, the positions of the first shift fork 491, the second shift fork 492, and the third shift fork 493 change in the direction along the drum shaft 48a (i.e., the axial direction). Thus, in accordance with the angle of rotation of the shift drum 48 about the drum shaft 48a, the first slider 451 moves on the driving shaft 41, and the second slider 452 and the third slider 453 move on the driven shaft 43.

When the first speed is selected in the switch 7, the second shift fork 492 causes the second slider 452 to move along the driven shaft 43. Accordingly, the first-speed dog projections 461 provided on the second slider 452 are engaged with the first-speed dog recesses 471 provided on the first-speed driven gear 441. The third-speed dog projections 463 are not engaged with the third-speed dog recesses 473 provided on the third-speed driven gear 443. Thus, the third-speed driven gear 443 rotates idly on the driven shaft 43.

At this time, the first shift fork 491 causes the first slider 451 to move to a neutral position. When the first slider 451 is in the neutral position, the fifth-speed dog projections 465 and the fifth-speed dog recesses 475 are not engaged with each other, and the sixth-speed dog projections 466 and the sixth-speed dog recesses 476 are not engaged with each other, either. Thus, the fifth-speed driving gear 425 and the sixth-speed driving gear 426 rotate idly on the driving shaft 41.

The third shift fork 493 causes the third slider 453 to move to the neutral position. When the third slider 453 is in the neutral position, the second-speed dog projections 462 and the second-speed dog recesses 472 are not engaged with each other, and the fourth-speed dog projections 464 and the fourth-speed dog recesses 474 are not engaged with each other, either. Thus, the second-speed driven gear 442 and the fourth-speed driven gear 444 rotate idly on the driven shaft 43.

In this manner, power transferred from the internal combustion engine 3 to the driving shaft 41 through the clutch mechanism 5 is transferred to the driven shaft 43 through the first-speed driving gear 421 and the first-speed driven gear 441.

Here, the expression that dog projections and dog recesses are engaged with each other refers to a state in which the dog projections and the dog recesses partially contact each other and transfer power. That is, the expression refers to a state in which the dog projections and the dog recesses mesh with each other.

As illustrated in FIG. 2, the vehicle 1 includes an output mechanism 10. The output mechanism 10 is connected to the rear wheel 22. As illustrated in FIG. 3, the output mechanism 10 includes an output gear 10a. The output gear 10a is disposed on the driven shaft 43. The output gear 10a is not rotatable on the driven shaft 43.

Thus, power transferred to the driven shaft 43 through the first-speed driving gear 421 and the first-speed driven gear 441 is transferred to the rear wheel 22 through the output mechanism 10 including the output gear 10a.

When the second speed is selected in the switch 7, the third shift fork 493 causes the third slider 453 to move along the driven shaft 43. Accordingly, the second-speed dog projections 462 provided on the third slider 453 are engaged with the second-speed dog recesses 472 provided on the second-speed driven gear 442. The fourth-speed dog projections 464 and the fourth-speed dog recesses 474 provided on the fourth-speed driven gear 444 are not engaged with each other. Thus, the fourth-speed driven gear 444 rotates idly on the driven shaft 43.

At this time, the first shift fork 491 causes the first slider 451 to move to the neutral position. When the first slider 451 is in the neutral position, the fifth-speed dog projections 465 and the fifth-speed dog recesses 475 are not engaged with each other, and the sixth-speed dog projections 466 and the sixth-speed dog recesses 476 are not engaged with each other, either. Thus, the fifth-speed driving gear 425 and the sixth-speed driving gear 426 rotate idly on the driving shaft 41.

The second shift fork 492 causes the second slider 452 to move to the neutral position. When the second slider 452 is in the neutral position, the first-speed dog projections 461 and the first-speed dog recesses 471 are not engaged with each other, and the third-speed dog projections 463 and the third-speed dog recesses 473 are not engaged with each other, either. Thus, the first-speed driven gear 441 and the third-speed driven gear 443 rotate idly on the driven shaft 43.

In this manner, power transferred from the internal combustion engine 3 to the driving shaft 41 through the clutch mechanism 5 is transferred to the driven shaft 43 through the second-speed driving gear 422 and the second-speed driven gear 442.

Thus, power transferred to the driven shaft 43 through the second-speed driving gear 422 and the second-speed driven gear 442 is transferred to the rear wheel 22 through the output mechanism 10 including the output gear 10a.

When the third speed is selected in the switch 7, the second shift fork 492 causes the second slider 452 to move along the driven shaft 43. Accordingly, the third-speed dog projections 463 provided on the second slider 452 are engaged with the third-speed dog recesses 473 provided on the third-speed driven gear 443. The first-speed dog projections 461 and the first-speed dog recesses 471 provided on the first-speed driven gear 441 are not engaged with each other. Thus, the first-speed driven gear 441 rotates idly on the driven shaft 43.

At this time, the first shift fork 491 causes the first slider 451 to move to the neutral position. When the first slider 451 is in the neutral position, the fifth-speed dog projections 465 and the fifth-speed dog recesses 475 are not engaged with each other, and the sixth-speed dog projections 466 and the sixth-speed dog recesses 476 are not engaged with each other, either. Thus, the fifth-speed driving gear 425 and the sixth-speed driving gear 426 rotate idly on the driving shaft 41.

The third shift fork 493 causes the third slider 453 to move to the neutral position. When the third slider 453 is in the neutral position, the second-speed dog projections 462 and the second-speed dog recesses 472 are not engaged with each other, and the fourth-speed dog projections 464 and the fourth-speed dog recesses 474 are not engaged with each other, either. Thus, the second-speed driven gear 442 and the fourth-speed driven gear 444 rotate idly on the driven shaft 43.

In this manner, power transferred from the internal combustion engine 3 to the driving shaft 41 through the clutch mechanism 5 is transferred to the driven shaft 43 through the third-speed driving gear 423 and the third-speed driven gear 443.

Thus, power transferred to the driven shaft 43 through the third-speed driving gear 423 and the third-speed driven gear 443 is transferred to the rear wheel 22 through the output mechanism 10 including the output gear 10a.

When the fourth speed is selected in the switch 7, the third shift fork 493 causes the third slider 453 to move along the driven shaft 43. Accordingly, the fourth-speed dog projections 464 provided on the third slider 453 are engaged with the fourth-speed dog recesses 474 provided on the fourth-speed driven gear 444. The second-speed dog projections 462 and the second-speed dog recesses 472 provided on the second-speed driven gear 442 are not engaged with each other. Thus, the second-speed driven gear 442 rotates idly on the driven shaft 43.

At this time, the first shift fork 491 causes the first slider 451 to move to the neutral position. When the first slider 451 is in the neutral position, the fifth-speed dog projections 465 and the fifth-speed dog recesses 475 are not engaged with each other, and the sixth-speed dog projections 466 and the sixth-speed dog recesses 476 are not engaged with each other, either. Thus, the fifth-speed driving gear 425 and the sixth-speed driving gear 426 rotate idly on the driving shaft 41.

The second shift fork 492 causes the second slider 452 to move to the neutral position. When the second slider 452 is in the neutral position, the first-speed dog projections 461 and the first-speed dog recesses 471 are not engaged with each other, and the third-speed dog projections 463 and the third-speed dog recesses 473 are not engaged with each other, either. Thus, the first-speed driven gear 441 and the third-speed driven gear 443 rotate idly on the driven shaft 43.

In this manner, power transferred from the internal combustion engine 3 to the driving shaft 41 through the clutch mechanism 5 is transferred to the driven shaft 43 through the fourth-speed driving gear 424 and the fourth-speed driven gear 444.

Thus, power transferred to the driven shaft 43 through the fourth-speed driving gear 424 and the fourth-speed driven gear 444 is transferred to the rear wheel 22 through the output mechanism 10 including the output gear 10a.

When the fifth speed is selected in the switch 7, the first shift fork 491 causes the first slider 451 to move along the driving shaft 41. Accordingly, the fifth-speed dog projections 465 provided on the first slider 451 are engaged with the fifth-speed dog recesses 475 provided on the fifth-speed driving gear 425. The sixth-speed dog projections 466 and the sixth-speed dog recesses 476 provided on the sixth-speed driving gear 426 are not engaged with each other. Thus, the sixth-speed driving gear 426 rotates idly on the driving shaft 41.

At this time, the second shift fork 492 causes the second slider 452 to move to the neutral position. When the second slider 452 is in the neutral position, the first-speed dog projections 461 and the first-speed dog recesses 471 are not engaged with each other, and the third-speed dog projections 463 and the third-speed dog recesses 473 are not engaged with each other, either. The third shift fork 493 causes the third slider 453 to move to the neutral position. When the third slider 453 is in the neutral position, the second-speed dog projections 462 and the second-speed dog recesses 472 are not engaged with each other, and the fourth-speed dog projections 464 and the fourth-speed dog recesses 474 are not engaged with each other, either. Thus, the first-speed driven gear 441, the second-speed driven gear 442, the third-speed driven gear 443, and the fourth-speed driven gear 444 rotate idly on the driven shaft 43.

In this manner, power transferred from the internal combustion engine 3 to the driving shaft 41 through the clutch mechanism 5 is transferred to the driven shaft 43 through the fifth-speed driving gear 425 and the fifth-speed driven gear 445.

Thus, power transferred to the driven shaft 43 through the fifth-speed driving gear 425 and the fifth-speed driven gear 445 is transferred to the rear wheel 22 through the output mechanism 10 including the output gear 10a.

When the sixth speed is selected in the switch 7, the first shift fork 491 causes the first slider 451 to move along the driving shaft 41. Accordingly, the sixth-speed dog projections 466 provided on the first slider 451 are engaged with the sixth-speed dog recesses 476 provided on the sixth-speed driving gear 426. The fifth-speed dog projections 465 and the fifth-speed dog recesses 475 provided on the fifth-speed driving gear 425 are not engaged with each other. Thus, the fifth-speed driving gear 425 rotates idly on the driving shaft 41.

At this time, the second shift fork 492 causes the second slider 452 to move to the neutral position. When the second slider 452 is in the neutral position, the first-speed dog projections 461 and the first-speed dog recesses 471 are not engaged with each other, and the third-speed dog projections 463 and the third-speed dog recesses 473 are not engaged with each other, either. The third shift fork 493 causes the third slider 453 to move to the neutral position. When the third slider 453 is in the neutral position, the second-speed dog projections 462 and the second-speed dog recesses 472 are not engaged with each other, and the fourth-speed dog projections 464 and the fourth-speed dog recesses 474 are not engaged with each other, either. Thus, the first-speed driven gear 441, the second-speed driven gear 442, the third-speed driven gear 443, and the fourth-speed driven gear 444 rotate idly on the driven shaft 43.

In this manner, power transferred from the internal combustion engine 3 to the driving shaft 41 through the clutch mechanism 5 is transferred to the driven shaft 43 through the sixth-speed driving gear 426 and the sixth-speed driven gear 446.

Thus, power transferred to the driven shaft 43 through the sixth-speed driving gear 426 and the sixth-speed driven gear 446 is transferred to the rear wheel 22 through the output mechanism 10 including the output gear 10a.

In the transmission in which a power transfer path is formed by engagement between the dog projections and the dog recesses, occurrence of dog clunking noise at a gear change is unavoidable. The inventor expected that dog clunking noise can be reduced by reducing the moment of inertia of a member related to collision. This is because if the moment of inertia of the member related to collision is small, collision energy directly related to dog clunking noise can be reduced. In view of this, first, the inventor had an idea of separating the dog projections from the gear related to power transfer.

In the transmission 4 according to this embodiment, the first slider 451 is disposed between the fifth-speed driving gear 425 and the sixth-speed driving gear 426 that are adjacent to each other. The first slider 451 can be displaced along the driving shaft 41. The first slider 451 includes the fifth-speed dog projections 465 and the sixth-speed dog projections 466. The first shift fork 491 is engaged with the first slider 451. In this manner, as compared to the case where a driving gear having dog projections is displaced along the driving shaft, the mass and the radius of a member having dog projections related to collision can be reduced. Thus, the moment of inertia of the member can be reduced. As a result, dog clunking noise can be reduced.

By relatively reducing the radius of the first slider 451 as described above, a force that enables the first shift fork 491 to displace the first slider 451 can be exerted at a position near the driving shaft 41. Accordingly, the posture of the first slider 451 in the displacement of the first slider 451 can be easily stabilized. Thus, not only occurrence of dog clunking noise but also incongruity sense of a driver due to variations of dog clunking noise can be reduced. In addition, the peripheral speed of the first slider 451 that rotates together with the driving shaft 41 in the first fork receiving groove 451a can be reduced. In this manner, abrasion of the first shift fork 491 can also be reduced.

The term "adjacent" refers to a state in which members are next to each other along one direction.

In the transmission 4 according to this embodiment, the second slider 452 is disposed between the first-speed driven gear 441 and the third-speed driven gear 443 that are adjacent to each other. The second slider 452 can be displaced along the driven shaft 43. The second slider 452 includes the first-speed dog projections 461 and the third-speed dog projections 463. The second shift fork 492 is engaged with the second slider 452.

The third slider 453 is disposed between the second-speed driven gear 442 and the fourth-speed driven gear 444 that are adjacent to each other. The third slider 453 can be displaced along the driven shaft 43. The third slider 453 has the second-speed dog projections 462 and the fourth-speed dog projections 464. The third shift fork 493 is engaged with the third slider 453.

In this manner, as compared to the case where a driven gear having dog projections is displaced along the driven shaft, the weight and the radius of a member having dog projections related to collision can be reduced. Thus, the moment of inertia of the member can be reduced. As a result, dog clunking noise can be reduced.

By relatively reducing the radius of the second slider 452, a force that enables the second shift fork 492 to displace the second slider 452 can be exerted at a position near the driven shaft 43. Accordingly, the posture of the second slider 452 in the displacement of the second slider 452 can be easily stabilized. Thus, not only occurrence of dog clunking noise but also incongruity sense of a driver due to variations of dog clunking noise can be reduced. In addition, the peripheral speed of the second slider 452 that rotates together with the driven shaft 43 in the second fork receiving groove 452a can be reduced. In this manner, abrasion of the third shift fork 493 can also be reduced.

By relatively reducing the radius of the third slider 453, a force that enables the third shift fork 493 to displace the third slider 453 can be exerted at a position near the driven shaft 43. Accordingly, the posture of the third slider 453 in the displacement of the third slider 453 can be easily stabilized. Thus, not only occurrence of dog clunking noise but also incongruity sense of a driver due to variations of dog clunking noise can be reduced. In addition, the peripheral speed of the third slider 453 that rotates together with the driven shaft 43 in the third fork receiving groove 453a can be reduced. In this manner, abrasion of the third shift fork 493 can also be reduced.

The inventor found that unless the fifth-speed driving gear 425 and the sixth-speed driving gear 426 are displaced along the driving shaft 41 as described above, it is unnecessary to obtain a large face width (the length of teeth of gears in the axial direction of the driving shaft 41) in the fifth-speed driving gear 425 and the sixth-speed driving gear 426 in order to maintain constant meshing between the driving gear and the driven gear, and the widths of the fifth-speed driving gear 425 and the sixth-speed driving gear 426 in the axial direction can be reduced. By reducing the thickness (width) of the fifth-speed driving gear 425 and the sixth-speed driving gear 426 adjacent to the first slider 451 in the axial direction, the moment of inertia of the fifth-speed driving gear 425 and the sixth-speed driving gear 426 related to collision of the fifth-speed dog projections 465 and the sixth-speed dog projections 466 can be reduced. In particular, in a transmission of a type in which a driving gear train and a driven gear train always mesh with each other, rotation of a specific driving gear by engagement between dog projections and dog recesses is transferred to a driven gear meshing with this driving gear. The rotation is transferred to the entire driven gear train through the driven shaft. Thus, by reducing the moment of inertia of a specific driving gear, the moment of inertia of the entire driven gear train including a driven gear meshing with the specific driving gear can be reduced. As a result, dog clunking noise can be further reduced.

Figure 8:
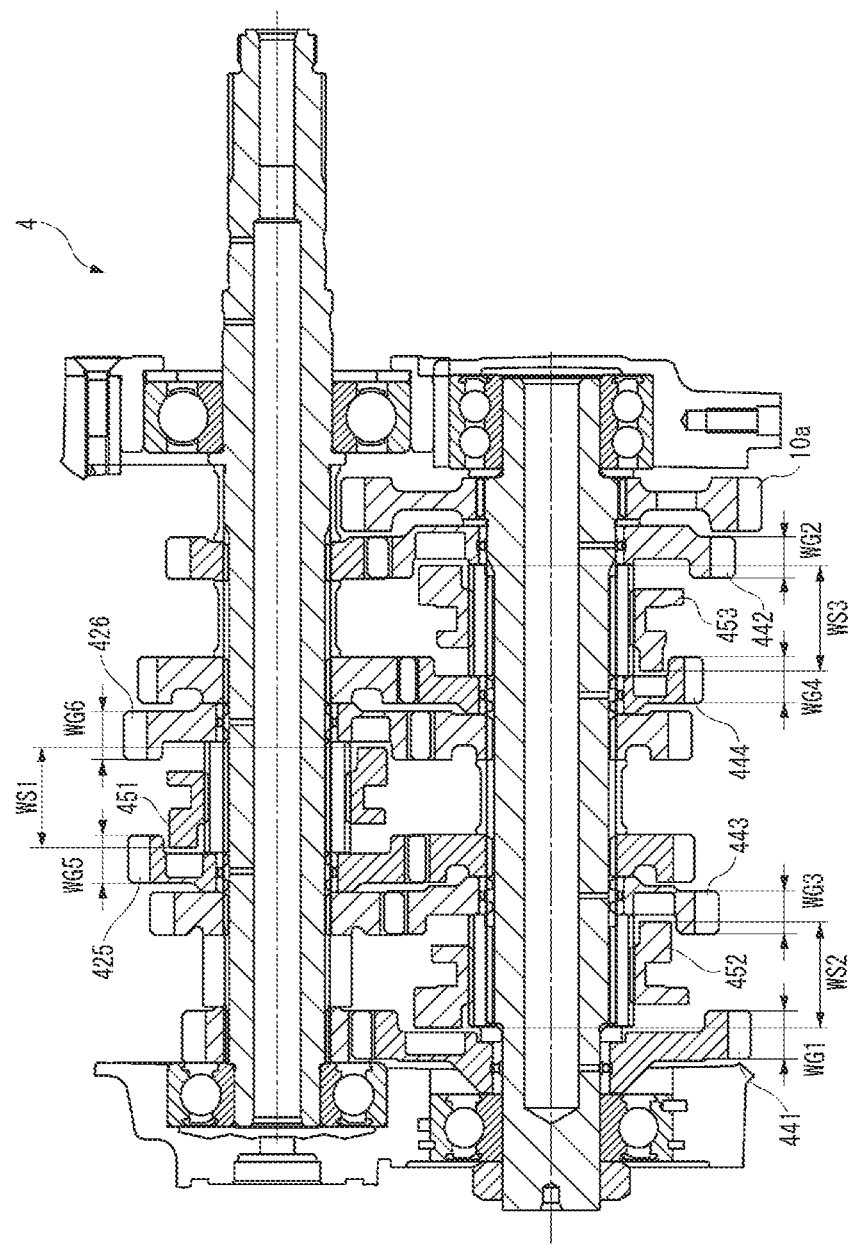
FIG. 8 is a cross-sectional view illustrating a specific configuration of a part of the transmission.

The inventor focused on a ratio between the maximum width of the first slider 451 in the direction along the driving shaft 41 (i.e., the axial direction) and the sum of the widths in the axial direction of the fifth-speed driving gear 425 and the sixth-speed driving gear 426 adjacent to the first slider 451, as an index for defining the thinness of the driving gear. Through an intensive study, the inventor found that a desired advantage can be obtained by reducing the widths of the fifth-speed driving gear 425 and the sixth-speed driving gear 426 in the axial direction so that the ratio is below 100%. That is, as illustrated in FIG. 8, in the axial direction, the sum of the widths of the fifth-speed driving gear 425 and the sixth-speed driving gear 426 adjacent to the first slider 451 (WG5+WG6) is smaller than a maximum width WS1 of the first slider 451.

The term "width in the axial direction" of a driving gear or a driven gear herein refers to the width (so-called face width) in a tooth portion of the gear in the axial direction of the driving shaft 41.

As described above, unless the first-speed driven gear 441 and the third-speed driven gear 443 are displaced along the driven shaft 43, it is unnecessary to obtain a large face width of the first-speed driven gear 441 and the third-speed driven gear 443 in order to maintain constant meshing between the driving gear and the driven gear. Thus, in the axial direction, the widths of the first-speed driven gear 441 and the third-speed driven gear 443 can be reduced. By reducing the thickness (width) of the first-speed driven gear 441 and the third-speed driven gear 443 adjacent to the second slider 452 in the axial direction, the moment of inertia of the first-speed driven gear 441 and the third-speed driven gear 443 related to the collision of the first-speed dog projections 461 and the third-speed dog projections 463 can be reduced. In particular, in a transmission of a type in which a driving gear train and a driven gear train always mesh with each other, rotation of a specific driven gear by engagement between dog projections and dog recesses is transferred to the entire driven gear train through the driven shaft. Thus, by reducing the moment of inertia of a specific driven gear, the moment of inertia of the entire driven gear train including the specific driven gear can be reduced. As a result, dog clunking noise can be further reduced.

Specifically, in the direction along the driven shaft 43 (i.e., axial direction), the widths of the first-speed driven gear 441 and the third-speed driven gear 443 adjacent to the second slider 452 are reduced in such a manner that a ratio of the sum of the widths of the first-speed driven gear 441 and the third-speed driven gear 443 with respect to the maximum width of the second slider 452 is below 100%. That is, as illustrated in FIG. 8, in the axial direction, the sum of the widths of the first-speed driven gear 441 and the third-speed driven gear 443 adjacent to the second slider 452 (WG1+WG3) is smaller than a maximum width WS2 of the second slider 452.

As described above, unless the second-speed driven gear 442 and the fourth-speed driven gear 444 are displaced along the driven shaft 43, it is unnecessary to obtain a large face widths of the second-speed driven gear 442 and the fourth-speed driven gear 444 in order to maintain constant meshing between the driving gear and the driven gear. Thus, in the axial direction, the widths of the second-speed driven gear 442 and the fourth-speed driven gear 444 can be reduced. By reducing the thickness (width) of the second-speed driven gear 442 and the fourth-speed driven gear 444 adjacent to the third slider 453 in the axial direction, the moment of inertia of the second-speed driven gear 442 and the fourth-speed driven gear 444 related to collision of the second-speed dog projections 462 and the fourth-speed dog projections 464 can be reduced. In particular, in a transmission of a type in which a driving gear train and a driven gear train always mesh with each other, rotation of a specific driven gear by engagement between dog projections and dog recesses is transferred to the entire driven gear train through the driven shaft. Thus, by reducing the moment of inertia of a specific driven gear, the moment of inertia of the entire driven gear train including the specific driven gear can be reduced. As a result, dog clunking noise can be further reduced.

Specifically, in the direction along the driven shaft 43 (i.e., axial direction), the widths of the second-speed driven gear 442 and the fourth-speed driven gear 444 adjacent to the third slider 453 are reduced in such a manner that a ratio of the sum of the widths of the second-speed driven gear 442 and the fourth-speed driven gear 444 with respect to the maximum width of the third slider 453 is below 100%. That is, as illustrated in FIG. 8, in the axial direction, the sum of the widths of the second-speed driven gear 442 and the fourth-speed driven gear 444 adjacent to the third slider 453 (WG2+WG4) is smaller than a maximum width WS3 of the third slider 453.

As a result, the configuration as described above can reduce incongruity sense of a driver due to dog clunking noise while reducing dog clunking noise.

In the transmission 4 according to this embodiment, as illustrated in FIG. 6, the pair of the fifth-speed driving gear 425 and the fifth-speed driven gear 445 and the pair of the sixth-speed driving gear 426 and the sixth-speed driven gear 446 are pairs of helical gears.

Helical gears are known to have a reduced tooth thickness (width of the gear in the axial direction) with desired gear strength. That is, the use of helical gears can reduce the gear widths of the pair of the fifth-speed driving gear 425 and the fifth-speed driven gear 445 related to engagement with the first slider 451 and the gear widths of the pair of the sixth-speed driving gear 426 and the sixth-speed driven gear 446. Thus, with this configuration, the moment of inertia of the gear groups can be further reduced. As a result, dog clunking noise can be further reduced.

Although not shown, the pair of the first-speed driving gear 421 and the first-speed driven gear 441 and the pair of the third-speed driving gear 423 and the third-speed driven gear 443 are pairs of helical gears.

In this case, the gear widths of the pair of the first-speed driving gear 421 and the first-speed driven gear 441 and the pair of the third-speed driving gear 423 and the third-speed driven gear 443 related to engagement with the second slider 452 can be reduced. Thus, with this configuration, the moment of inertia of the gear groups can be further reduced. As a result, dog clunking noise can be further reduced.

The pair of the second-speed driving gear 422 and the second-speed driven gear 442 and the pair of the fourth-speed driving gear 424 and the fourth-speed driven gear 444 are pairs of helical gears.

In this case, the gear widths of the pair of the second-speed driving gear 422 and the second-speed driven gear 442 and the pair of the fourth-speed driving gear 424 and the fourth-speed driven gear 444 related to engagement with the third slider 453 can be reduced. Thus, with this configuration, the moment of inertia of the gear groups can be further reduced. As a result, dog clunking noise can be further reduced.

A clearly shown in FIGS. 4 and 6, the plurality of fifth-speed dog projections 465 and the plurality of sixth-speed dog projections 466 disposed on the first slider 451 have gear shapes when viewed in the axial direction of the driving shaft 41. In the following description, the gear shape refers to the shape of teeth of a gear.

Although not shown, the plurality of first-speed dog projections 461 and the plurality of sixth-speed dog projections 466 provided on the second slider 452 have gear shapes when viewed in the axial direction. The plurality of second-speed dog projections 462 and the plurality of fourth-speed dog projections 464 provided on the third slider 453 have gear shapes when viewed in the axial direction.

Helical gears are known to enable thickness reduction of the gears and are unlikely to have stable posture under a thrust. However, the use of the dog projections having the shape described above can increase the number of portions engaged with dog projections in the circumferential direction of the gear. Accordingly, the posture of the helical gears can be easily stabilized. As a result, this configuration can further reduce incongruity sense of a driver due to dog clunking noise.

In this embodiment, as clearly shown in FIGS. 4 and 6, the fifth-speed dog projections 465 and the sixth-speed dog projections 466 are provided on the first slider 451.

With this configuration, as compared to a configuration in which the fifth-speed dog recesses 475 and the sixth-speed dog recesses 476 are provided on the first slider 451, a dimension of the first slider 451 in the direction orthogonal to the axial direction (radial direction of the fifth-speed driving gear 425 and the sixth-speed driving gear 426) can be reduced. Accordingly, the mass and the radius (i.e., moment of inertia) of the first slider 451 can be further reduced. As a result, dog clunking noise can be further reduced.

Although now shown, the first-speed dog projections 461 and the third-speed dog projections 463 are provided on the second slider 452.

With this configuration, as compared to a configuration in which the first-speed dog recesses 471 and the third-speed dog recesses 473 are provided on the second slider 452, a dimension of the second slider 452 in the direction orthogonal to the axial direction (radial direction of the first-speed driven gear 441 and the third-speed driven gear 443) can be reduced. Accordingly, the mass and the radius (i.e., moment of inertia) of the second slider 452 can be further reduced. As a result, dog clunking noise can be further reduced.

The second-speed dog projections 462 and fourth-speed dog projections 464 are provided on the third slider 454.

With this configuration, as compared to a configuration in which the second-speed dog recesses 472 and the fourth-speed dog recesses 474 are provided on the third slider 453, a dimension of the third slider 453 in the direction orthogonal of the axial direction (radial direction of the second-speed driven gear 442 and the fourth-speed driven gear 444) can be reduced. Accordingly, the mass and the radius (i.e., moment of inertia) of the third slider 453 can be further reduced. As a result, dog clunking noise can be further reduced.

As described above, the vehicle 1 according to this embodiment includes the switch 7 and the electric actuator 9. The switch 7 is operated by a driver. The electric actuator 9 rotates the shift drum 48 of the transmission 40 in accordance with an operation of the switch 7.

With this configuration, the rotation angle and the rotation timing of the shift drum 48 can be more accurately controlled by using the electric actuator 9. In the case of the first slider 451, synchronization of rotation phases can be easily obtained in engagement between the fifth-speed dog projections 465 and the fifth-speed dog recesses 475 or engagement between the sixth-speed dog projections 466 and the sixth-speed dog recesses 476. Accordingly, dog clunking noise can be easily reduced. As a result, incongruity sense of a driver due to dog clunking noise can be further reduced.

The embodiment described above is merely an example for facilitating understanding of the invention. The configuration according to the embodiment can be changed or improved as appropriate without departing from the gist of the invention. It is clear that an equivalent is included in the technical range of the invention.

As indicated by chain double-dashed lines in FIG. 2, the vehicle 1 may further include a sub-transmission mechanism 11. In this case, the sub-transmission mechanism 11 is related to a transfer direction of power generated by the internal combustion engine 3, and is disposed upstream of the driving shaft 41 or downstream of the driven shaft 43. The sub-transmission mechanism 11 includes two pairs of driving gears and driven gears having different transmission ratios. The sub-transmission mechanism 11 is a mechanism that substantially doubles the number of gear stages that can be shifted in the transmission 4.

When the number of gear stages increases as described above, frequency of transmission operations, that is, frequency of occurrence of dog clunking noise, increases. However, since not only dog clunking noise itself but also variations of noise can be reduced as described above, incongruity sense of a driver can be still reduced even when the number of gear stages is increased.

In the embodiment, an operation of the electric actuator 9 for rotating the shift drum 48 is controlled by the switch 7 provided on the handlebar 6. The switch 7 is not necessarily disposed on the handlebar 6 to be operated by a driver's hand. For example, the switch 7 may be disposed near a foot pedal of the vehicle 1. The switch 7 may be operated by a driver's foot.

An operation of the electric actuator 9 for rotating the shift drum 48 is not necessarily controlled by a driver's operation of the switch 7. The control section 8 may automatically control an operation of the electric actuator 9 in accordance with travelling conditions of the vehicle 1 detected by an unillustrated vehicle-mounted sensor.

With this configuration, a transmission operation can be automatically carried out without an operation by a driver. The automatic transmission operation is often performed at a timing different from a timing intended by the driver, and dog clunking noise tends to be more noticeable to the driver. However, as described above, the configuration of the embodiment can reduce not only dog clunking noise itself but also variations of noise. Thus, even in the configuration that performs automatic transmission, incongruity sense of the driver can be reduced.

The transmission 4 according to the embodiment described above has a configuration capable of performing six stages of transmission. However, the number of stages to which the transmission 4 can be shifted can be determined as appropriate in accordance with specifications of the vehicle 1. The number of pairs of driving gears and driven gears included in the transmission 4 can be determined as appropriate in accordance with the number of stages in combination with whether the sub-transmission mechanism 11 is employed or not.

In the transmission 4, the number of stages to which the transmission 4 can be shifted may be five or less or seven or more. In a case where the number of stages to which the transmission 4 can be shifted is an odd number, such as five or seven, gears rotatable on the shaft can be disposed at only one side of the slider in the axial direction of the shaft on which the slider is disposed. To such gears, the ratio between the maximum width of the slider and the sum of the widths of a pair of gears adjacent to the slider is not applied.

Whether each driving gear is rotatable on the driving shaft 41 or not is not limited to the example described as the embodiment, and is determined as appropriate depending on specifications of the transmission 4. In a case where a specific driving gear is rotatable on the driving shaft 41, a driven gear meshing with this driving gear is not rotatable on the driven shaft 43. In a case where a specific driving gear is not rotatable on the driving shaft 41, a driven gear meshing with this driving gear is rotatable on the driven shaft 43.

The number of sliders included in the transmission 4 can be determined as appropriate depending on the number of pairs of driving gears and driven gears. At this time, whether each of the sliders is disposed between a pair of adjacent driving gears or between a pair of adjacent driven gears can be determined as appropriate depending on specifications of the transmission 4. A relationship between the maximum width of the slider and the sum of the widths of a pair of driving gears adjacent to the slider in the axial direction or the sum of the widths of a pair of driven gears described with reference to FIG. 8 only needs to be established for at least one slider included in the transmission 4.

At least one of a plurality of pairs of driving gears and driven gears included in the transmission 4 may be a pair of spur gears.

In the embodiment, both the fifth-speed dog projections 465 and the sixth-speed dog projections 466 are provided on the first slider 451. However, at least one of the fifth-speed dog recesses 475 or the sixth-speed dog recesses 476 may be provided on the first slider 451. In a case where the fifth-speed dog recesses 475 are provided on the first slider 451, the fifth-speed dog projections 465 are provided on the fifth-speed driving gear 425. In a case where the sixth-speed dog recesses 476 are provided on the first slider 451, the sixth-speed dog projections 466 are provided on the sixth-speed driving gear 426.

In the embodiment, both the first-speed dog projections 461 and the third-speed dog projections 463 are provided on the second slider 452. However, at least one of the first-speed dog recesses 471 or the third-speed dog recesses 473 may be provided on the second slider 452. In a case where the first-speed dog recesses 471 are provided on the second slider 452, the first-speed dog projections 461 are provided on the first-speed driven gear 441. In a case where the third-speed dog recesses 473 are disposed on the second slider 452, the third-speed dog projections 463 are provided on the third-speed driven gear 443.

In the embodiment, both the second-speed dog projections 462 and the fourth-speed dog projections 464 are provided on the third slider 453. However, at least one of the second-speed dog recesses 472 or the fourth-speed dog recesses 474 may be provided on the third slider 453. In a case where the second-speed dog recesses 472 are provided on the third slider 453, the second-speed dog projections 462 are provided on the second-speed driven gear 442. In a case where the fourth-speed dog recesses 474 are provided on the third slider 453, the fourth-speed dog projections 464 are provided on the fourth-speed driven gear 444.

In the embodiment, all the first-speed dog projections 461, the second-speed dog projections 462, the third-speed dog projections 463, the fourth-speed dog projections 464, the fifth-speed dog projections 465, and the sixth-speed dog projections 466 have gear shapes when viewed in the axial direction. However, at least one of the first-speed dog projections 461, the second-speed dog projections 462, the third-speed dog projections 463, the fourth-speed dog projections 464, the fifth-speed dog projections 465, or the sixth-speed dog projections 466 may be protrusions arranged along the rotation direction of the driving gears and the driven gears about the driving shaft 41 or the driven shaft 43 and extending toward the corresponding driving gears or driven gears. In this case, the number and shape of at least one of the first-speed dog recesses 471, the second-speed dog recesses 472, the third-speed dog recesses 473, the fourth-speed dog recesses 474, the fifth-speed dog recesses 475, or the sixth-speed dog recesses 476 may be defined as appropriate so that these recesses can be engaged with the protrusions.

Figure 9A:
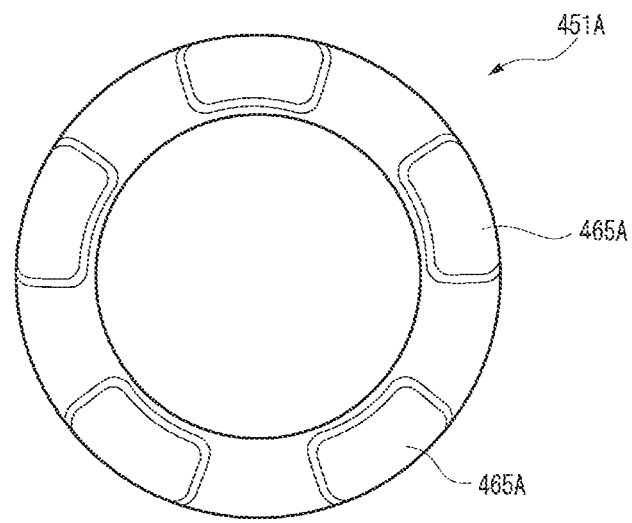
FIG. 9A is a view illustrating a variation of a slider part of the transmission.
Figure 9B:
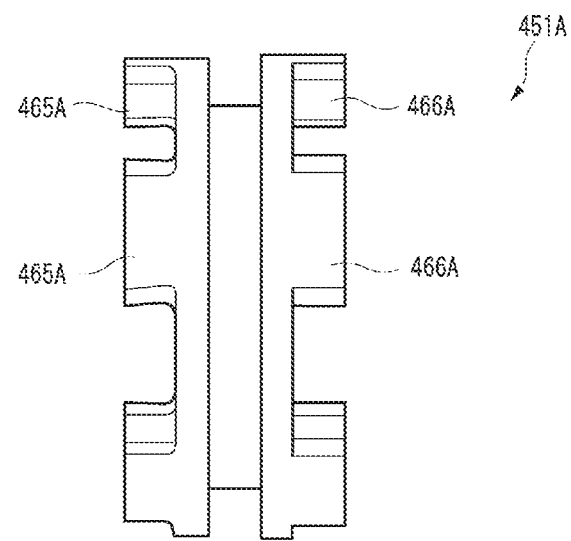
FIG. 9B is a view illustrating the variation of the slider part of the transmission from another perspective.

FIG. 9 illustrates, as an example, a first slider 451A having a configuration as described above according to a variation, where (A) illustrates an appearance of the first slider 451A when viewed in the axial direction of the driving shaft 41, and (B) illustrates an appearance of the first slider 451A when viewed in a direction orthogonal to the axial direction. The first slider 451A includes fifth-speed dog projections 465A and sixth-speed dog projections 466A configured as described above.

The vehicle 1 according to the embodiment includes the internal combustion engine 3 as a power source. However, as long as the transmission 4 that performs transmission using the shift drum 48 is included, a motor may be used as the power source.

The vehicle 1 according to the embodiment is a motor-cycle. However, with the transmission 4 that performs transmission using the shift drum 48, the number of front wheels 21 and the number of rear wheels 22 included in the vehicle 1 can be defined as appropriate.

The invention claimed is:
1. A forward multi-stage transmission that is mountable on a vehicle, the transmission comprising a forward multi-stage transmission that does not include a reverse gear, the transmission including:
a driving shaft connectable to a power source through a clutch mechanism;
a forward first driving gear and a forward second driving gear arranged on the driving shaft along an axial direction and fixed to the driving shaft in the axial direction;
a driven shaft extending in the axial direction;
a forward first driven gear and a forward second driven gear arranged on the driven shaft along the axial direction and fixed to the driven shaft in the axial direction, the forward first driven gear meshing with the forward first driving gear, the forward second driven gear meshing with the forward second driving gear;
a slider, the slider not having teeth of a gear protruding in a radial direction when viewed in the axial direction, positioned on either the driving shaft or the driven shaft, such that when the slider is positioned on the driving shaft, the slider is movable in the axial direction between the forward first driving gear and the forward second driving gear, the slider being a separate member from the forward first driving gear and the forward second driving gear and the slider not meshing with any gear disposed on the driven shaft, and such that when the slider is positioned on the driven shaft, the slider is moveable in the axial direction between the forward first driven gear and the forward second driven gear, the slider being a separate member from the forward first driven gear and the forward second driven gear, and the slider not meshing with any gear disposed on the driving shaft;
a shift drum disposed to be rotatable about a drum shaft extending in the axial direction; and
a shift fork coupling the shift drum and the slider to each other, wherein
a first dog projection is provided on one of the slider or the forward first driving gear in a case where the slider is disposed on the driving shaft, or provided on one of the slider or the forward first driven gear in a case where the slider is provided on the driven shaft,
a first dog recess is provided on the other one of the slider or the forward first driving gear in a case where the slider is provided on the driving shaft, or provided on the other one of the slider or the forward first driven gear in a case where the slider is provided on the driven shaft,
a second dog projection is provided on one of the slider or the forward second driving gear in a case where the slider is provided on the driving shaft, or provided on one of the slider or the forward second driven gear in a case where the slider is provided on the driven shaft,
a second dog recess is provided on the other one of the slider or the forward second driving gear in a case where the slider is provided on the driving shaft, or provided on the other one of the slider or the forward second driven gear in a case where the slider is provided on the driven shaft,
in a case where the slider is provided on the driving shaft, the forward first driving gear and the forward second driving gear are rotatable on the driving shaft, and the forward first driven gear and the forward second driven gear are not rotatable on the driven shaft,
in a case where the slider is provided on the driven shaft, the forward first driving gear and the forward second driving gear are not rotatable on the driving shaft, and the forward first driven gear and the forward second driven gear are rotatable on the driven shaft, in a case where the slider is provided on the driving shaft, the slider is not rotatable on the driving shaft, and in a case where the slider is provided on the driven shaft, the slider is not rotatable on the driven shaft, a transmission ratio between the forward first driving gear and the forward first driven gear is different from a transmission ratio between the forward second driving gear and the forward second driven gear, when rotation of the shift drum changes a position of the shift fork in the axial direction so that the slider moves in the axial direction on the driving shaft or the driven shaft, the first dog projection of the forward first driven gear and the first dog recess of the forward first driven gear are engaged with each other or the second dog projection of the forward second driven gear and the second dog recess of the forward second driven gear are engaged with each other, in a case where the slider is provided on the driving shaft, a sum of a face width of the forward first driving gear fixed to the driving shaft in the axial direction and a face width of the forward second driving gear fixed to the driving shaft in the axial direction is smaller than a maximum width of the slider, and in a case where the slider is provided on the driven shaft, a sum of a face width of the forward first driven gear fixed to the driven shaft in the axial direction and a face width of the forward second driven gear fixed to the driven shaft in the axial direction is smaller than the maximum width of the slider.

2. The transmission of claim 1, wherein at least one of a pair of the first forward driving gear and the forward first driven gear or a pair of the forward second driving gear and the forward second driven gear is a pair of helical gears.

3. The transmission of claim 2, wherein at least one of the first dog projection or the second dog projection has a gear shape when viewed in the axial direction.

4. The transmission of claim 1, wherein at least one of the first dog projection or the second dog projection is provided on the slider.

5. The transmission of claim 1, further comprising a sub-transmission mechanism disposed upstream of the driving shaft or downstream of the driven shaft in a direction in which power generated by the power source is transferred.

6. A vehicle, comprising:
the transmission of claim 1;
a switch that is operated by a driver; and
an electric actuator that rotates the shift drum in accordance with an operation of the switch by the driver.

7. A vehicle, comprising:
the transmission of claim 1;
an electric actuator that rotates the shift drum; and
a control section that controls an operation of the electric actuator in accordance with a travelling condition of the vehicle.

8. The transmission of claim 2, wherein at least one of the first dog projection or the second dog projection is provided on the slider.

9. The transmission of claim 3, wherein at least one of the first dog projection or the second dog projection is provided on the slider.

* * * * *